US012792405B2

(12) United States Patent
Feng et al.

(10) Patent No.: US 12,792,405 B2
(45) Date of Patent: Nov. 10, 2026

(54) SCHEDULING SERVICES IN CLOUD-BASED SYSTEMS TO AVOID TIMEOUT

(71) Applicant: SAP SE, Walldorf (DE)

(72) Inventors: Dabin Feng, Shanghai (CN); Xia Yu, Shanghai (CN)

(73) Assignee: SAP SE, Walldorf (DE)

( * ) Notice: Subject to any disclaimer, the term of this patent is extended or adjusted under 35 U.S.C. 154(b) by 560 days.

(21) Appl. No.: 18/365,366

(22) Filed: Aug. 4, 2023

(65) Prior Publication Data

US 2025/0045109 A1 Feb. 6, 2025

(51) Int. Cl.
*G06F 9/46* (2006.01)
*G06F 9/50* (2006.01)

(52) U.S. Cl.
CPC .................................. *G06F 9/5027* (2013.01)

(58) Field of Classification Search
None
See application file for complete search history.

(56) References Cited

U.S. PATENT DOCUMENTS

2014/0250436 A1* 9/2014 Tang ...................... G06F 9/466 718/1

OTHER PUBLICATIONS

Feilong et al; Transaction Management for Reliable Gid Application; IEEE 2009 (Year: 2009).*

* cited by examiner

*Primary Examiner* — Bing Zhao
(74) *Attorney, Agent, or Firm* — Fish & Richardson P.C.

(57) ABSTRACT

Methods, systems, and computer-readable storage media for receiving, by a scheduled transaction manager, a first request for a first global transaction for an application executed within a cloud-based system, the application including a set of services where execution of the first global transaction requires a set of participant services, in response to receiving the first request, transmitting, by a scheduled transaction coordinator, a first set of requests for a first set of local transactions to the set of participant services, receiving, by the scheduled transaction coordinator, indications of reserved resources from participant services, and determining that received indication of reserved resources have been received from all participant services in the set of participant services, and in response, inhibiting cancelation of resource reservations for each of the participant services in the set of participant services, and receiving one or more results of local transactions in the set of local transactions.

20 Claims, 5 Drawing Sheets

SCHEDULING SERVICES IN CLOUD-BASED SYSTEMS TO AVOID TIMEOUT

BACKGROUND

Cloud computing can be described as Internet-based computing that provides shared computer processing resources and data to computers and other devices on demand. Users can establish respective sessions, during which processing resources and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

In cloud-based environments, applications can be provisioned using services, also referred to as microservices, which have gained popularity in service-oriented architectures (SOAs). In service-based architectures, applications are composed of multiple, independent services, and are deployed in standalone containers with a well-defined interface. The services are deployed and managed by a cloud platform and execute on top of a cloud infrastructure.

Issues can arise when execution of a single transaction requires multiple microservices. Larger or more comprehensive transactions, called global transactions, cannot be completed without all the required microservices executing their individual smaller transactions, called local transactions. In some cases, all microservices involved in completing a particular global transaction will begin their execution of individual local transactions, but if at least one microservice fails in completing its local transaction, the time used by the other microservices in completing their local transactions is lost. This reduces overall system efficiency as those microservices could have been provisioned to other global transactions and assisted in completing those global transactions. In addition, some interim results in some local transactions must be rolled back if the entire global transaction is not completed, and this requires additional resources and time. This problem can be exacerbated if microservices call other microservices to assist in completing some transactions.

SUMMARY

Implementations of the present disclosure are directed to a transaction management system for managing execution of transactions in cloud-based systems. More particularly, implementations of the present disclosure are directed to a transaction management system that includes schedule managers for global transactions and local transactions that operate to ensure resources are available for transaction execution.

In some implementations, actions include receiving, by a scheduled transaction manager, a first request for a first global transaction for an application executed within a cloud-based system, the application including a set of services where execution of the first global transaction requires a set of participant services from the set of services, in response to receiving the first request for the first global transaction, transmitting, by a scheduled transaction coordinator, a first set of requests for a first set of local transactions to the set of participant services, receiving, by the scheduled transaction coordinator, indications of reserved resources from participant services, and determining that received indication of reserved resources have been received from all participant services in the set of participant services, and in response, inhibiting cancelation of resource reservations for each of the participant services in the set of participant services, and receiving one or more results of local transactions in the set of local transactions. Other implementations of this aspect include corresponding systems, apparatus, and computer programs, configured to perform the actions of the methods, encoded on computer storage devices.

These and other implementations can each optionally include one or more of the following features: actions further include repeatedly reserving resources for at least one participant service prior to determining that received indication of reserved resources have been received from all participant services in the set of participant services; in response to determining that received indication of reserved resources have been received from all participant services in the set of participant services, transitioning a transaction state of each local transaction to a confirmed state indicating that the respective local transaction is confirmed; in response to determining that a local transaction has been executed, transitioning a transaction state of the local transaction to committed indicating commitment of a result of the local transaction to resources in a respective participant service; determining that received indication of reserved resources have been received from all participant services in the set of participant services occurs prior to expiration of a global transaction timeout; actions further include receiving, by the scheduled transaction manager, a second request for a second global transaction for the application, in response to receiving the request for the second global transaction, transmitting, by the scheduled transaction coordinator, a second set of requests for a second set of local transactions to the set of participant services, and determining that an intersected reservation period is not achieved before a global transaction timeout has expired, and in response, cancelling resource reservations of one or more participant services; and the set of participant services are services in the set of services and the initiator service is a service in the set of services.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Figure 1:
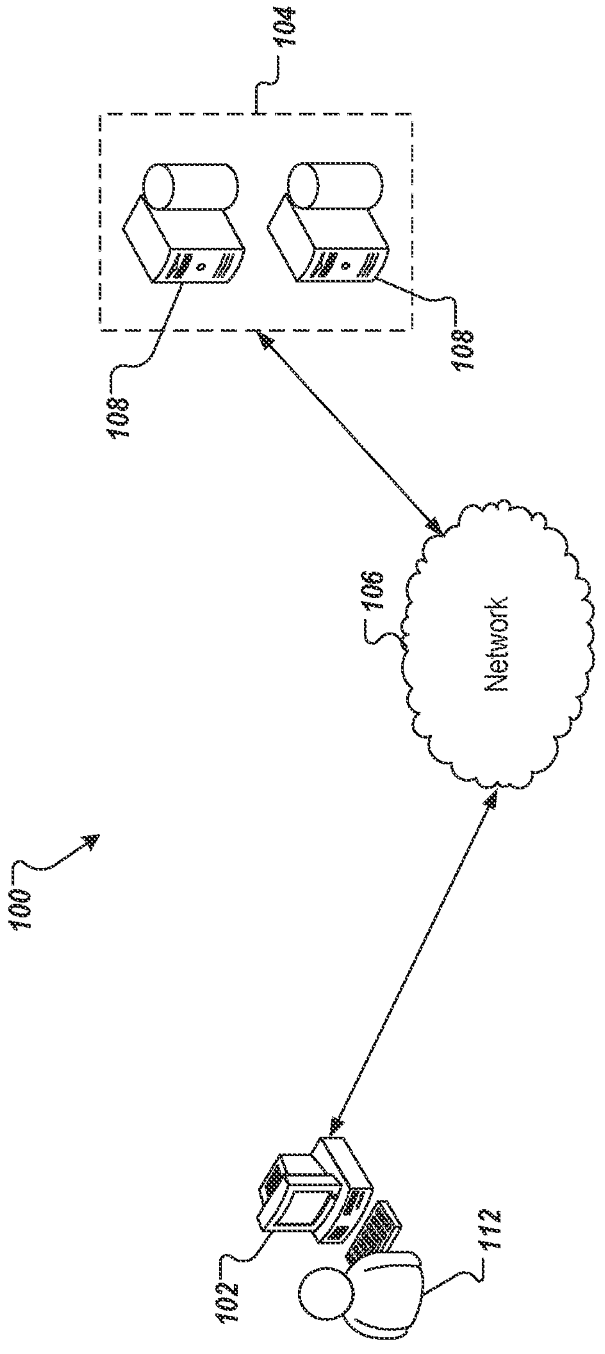
FIG. 1 depicts an example architecture that can be used to execute implementations of the present disclosure.

Implementations of the present disclosure are directed to a transaction management system for managing execution of transactions in cloud-based systems. More particularly, implementations of the present disclosure are directed to a transaction management system that includes schedule managers for global transactions and local transactions that operate to ensure resources are available for complete transaction execution such that one or more resources are not tied-up for their respective local transaction only to have that work rolled back if another service is unable to complete its local transaction. Implementations can include actions of receiving, by a scheduled transaction manager, a first request for a first global transaction for an application executed within a cloud-based system, the application comprising a set of services where execution of the first global transaction requires a set of participant services from the set of services, in response to receiving the first request for the first global transaction, transmitting, by a scheduled transaction coordinator, a first set of requests for a first set of local transactions to the set of participant services, receiving, by the scheduled transaction coordinator, indications of reserved resources from participant services, and determining that received indication of reserved resources have been received from all participant services in the set of participant services, and in response, inhibiting cancelation of resource reservations for each of the participant services in the set of participant services, and receiving one or more results of local transactions in the set of local transactions.

To provide further context for implementations of the present disclosure, and as introduced above, cloud computing can be described as Internet-based computing that provides shared computer processing resources and data to computers and other devices on demand. Users can establish respective sessions, during which processing resources and bandwidth are consumed. During a session, for example, a user is provided on-demand access to a shared pool of configurable computing resources (e.g., computer networks, servers, storage, applications, and services). The computing resources can be provisioned and released (e.g., scaled) to meet user demand.

In cloud-based environments, software applications can be divided up into smaller modules called microservices or services. Each service is a set of code that consumes resources such as computer networks, servers, CPU time, memory, bandwidth and other code in order to complete a transaction. An example would be a travel application that assists a user in booking a trip. Successful booking of a singular trip is an example of a global transaction. However, that successful global transaction relies on successful booking of smaller transactions such booking a hotel room, booking an airline ticket and booking a rental car. These smaller transactions can be considered to be local transactions. Each local transaction must be completed if the entire trip, which can be considered a global transaction, is to be successful. But this means that if one local transaction is unsuccessful, such as booking the airline ticket, then the other local transactions, the hotel and rental car bookings, should be cancelled. Thus, a global transaction can be defined as a transaction that is dependent on another transaction in order to complete execution and a local transaction can be defined as one that executes independently of other transactions.

Software applications can be provisioned using services, also referred to as microservices, which have gained popularity in service-oriented architectures (SOAs). In service-oriented architectures, applications are executed using multiple, independent services that are deployed in standalone containers with a well-defined interface. The services are deployed and managed by a cloud platform and execute on top of a cloud infrastructure.

In executing as part of an application, services can depend on functionality provided by one or more other services. For purposes of illustration, a non-limiting example can include an application that is composed of a first service, a second service, a third service, and a fourth service. In this example, a transaction is requested for execution by the first service. For example, a request is received to request that the application perform some task(s) and, in response, the first service can request that a transaction be executed by the second service and a transaction to be executed by the third service by sending requests to the second service and the third service (e.g., functionality of the first service can depend on output provided by the second service and the third service). In this example, the third service can request that a transaction be executed by the fourth service by sending a request to the fourth service (e.g., functionality of the third service can depend on output provided by the fourth service).

In general, a transaction can be described as a set of operations to be performed by a respective service or services. In some examples, each transaction is guaranteed to be atomic, which means that transactions must be completed in full and never partially completed. That is, either all of the operations in the transaction are applied or none of the operations in the transaction are applied. Further, each transaction can be associated with a respective timeout period. For example, if a transaction is not completed before the timeout period, the transaction expires and is canceled. Any operations already performed for the transaction are rolled back. Transactions can fail to complete for various reasons (e.g., insufficient resources to execute the transaction, the transaction fails waiting for resources to become available).

As discussed above, transactions can depend on other transactions. Consequently, if one transaction fails to complete, all other related transactions need to be canceled and any operations rolled back. This raises numerous issues. From a technical perspective, technical resources (e.g., processors, memory) are wasted in canceling and rolling back. Further, resources that are reserved during the timeout period are unavailable for other transactions, which can result in those transactions being delayed and/or ultimately timing out. From a usability perspective, performance of the overall system degrades. For example, an upstream user and/or system may be relying on completion of the transaction and canceling/rollback requires the user and/or system to reinitiate the transaction.

To highlight these deficiencies, reference the non-limiting example above where the second service can complete its transaction, but the fourth service fails to complete its transaction (e.g., the transaction times-out). Consequently, the transaction of the second service must be rolled back, and any operations of the respective transactions of the first service, the third service, and the fourth service must also be rolled back, and all transactions canceled. The rollback process consumes technical resources at each system level. Further, resources reserved by the second service are unavailable to any other transactions requested of the second service, limiting throughput of the second service. This is also true of resources consumed by each of the first service, third service, and fourth service in performing at least some of the operations of their respective transactions.

In view of the above context, implementations of the present disclosure provide a transaction management system that includes schedule managers for global transactions and local transactions that operate to ensure resources are available for execution of global transactions. In some implementations, and as described in further detail herein, an initiating service can initiate a global transaction that relies on multiple local transactions performed by so-called participant services. A scheduled transaction manager manages execution of the global transaction in conjunction with a scheduled transaction coordinator. In some examples, the scheduled transaction coordinator coordinates execution of local transactions with each of one or more participant services. As described in further detail herein, the schedulers for global transaction and local transactions attempt, agree, and confirm or cancel transactions within a reservation period to improve efficiency and conserve technical resources in transaction management.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In some examples, the server system 104 can host one or more cloud-based applications that execute functionality. In some examples, a cloud-based application can execute functionality in response to requests received from any appropriate source (e.g., users, software systems). For example, a cloud-based application can execute functionality in response to the user 112, which submits a request to the cloud-based application through the client device 102.

In accordance with implementations of the present disclosure, and as noted above, the server system 104 can host a transaction management system for coordinating transactions executed by services that a cloud-based application is composed of. For example, and as described in further detail herein, the transaction management system includes schedule managers for global transactions and schedule coordinators for local transactions that operate to ensure resources are available for transaction execution.

Figure 2A:
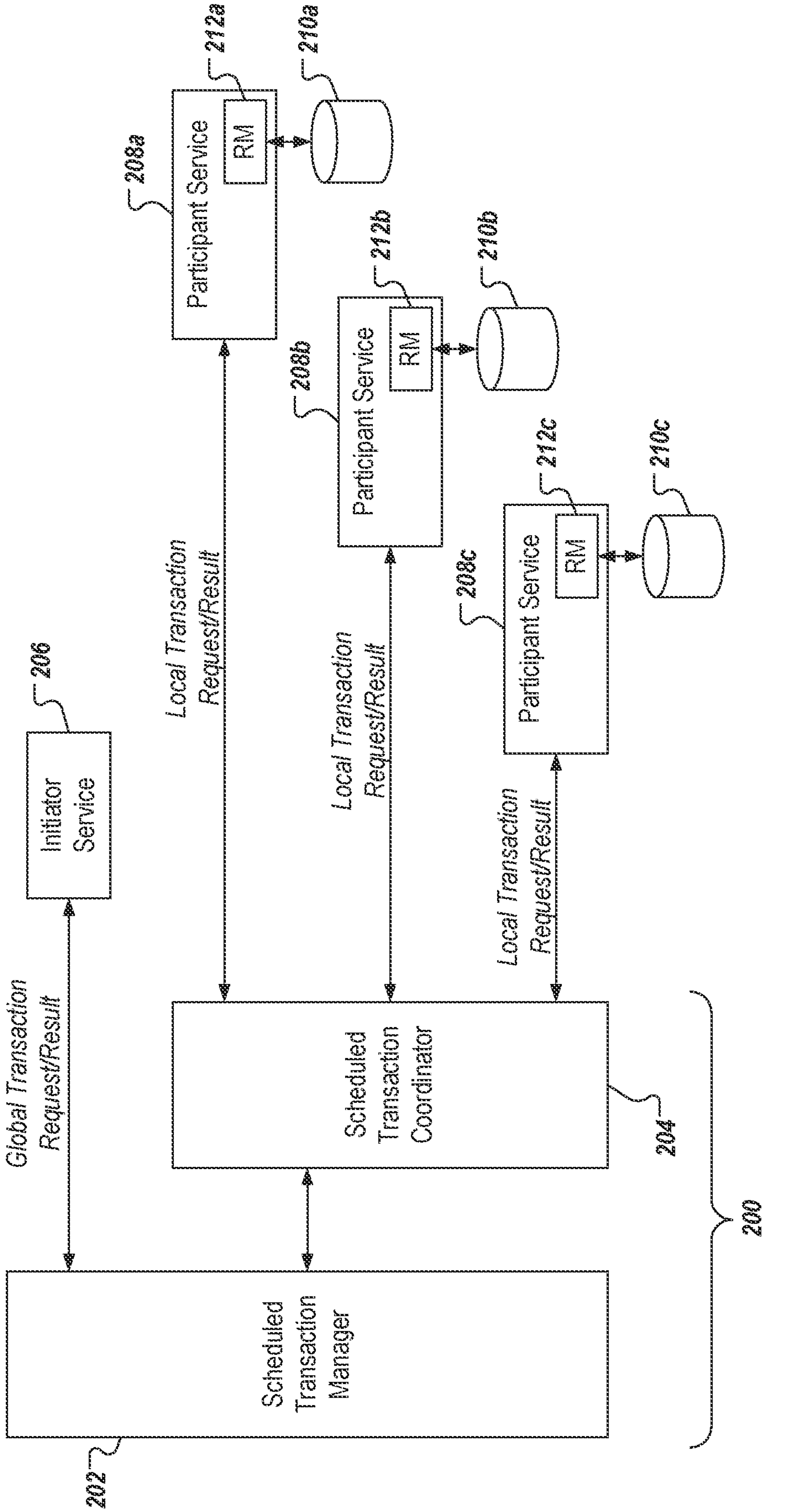
FIG. 2A depicts an example transaction management system in accordance with implementations of the present disclosure.

FIG. 2 depicts an example transaction management system 200 in accordance with implementations of the present disclosure. In the depicted example, the transaction management system 200 includes a scheduled transaction manager 202 and a scheduled transaction coordinator 204. Although a single scheduled transaction manager 202 and a single scheduled transaction coordinator 204 are depicted in FIG. 2A, it is contemplated that implementations of the present disclosure can be realized using any appropriate number of scheduled transaction managers and/or scheduled transaction coordinators. In some examples, each of the scheduled transaction manager 202 and the scheduled transaction coordinator 204 is provided as one or more computer-executable programs. The example of FIG. 2A further provides an initiator service 206 and participant services *208a*, *208b*, *208c*, which interact with respective data stores *210a*, *210b*, *210c*. In some examples, one or more of the data stores *210a*. *210b*, *210c* represent database system(s) that services, such as the participant services *208a*, *208b*, *208c* interact with (e.g., request data from, write data to, modify data within) to perform at least part of a local transaction.

As depicted in FIG. 2A, each participant service *208a*, *208b*, *208c* includes a respective resource manager (RM) *212a*, *212b*, *212c*. In some examples, the RMs are provisioned to the respective participant services *208a*, *208b*, *208c* as part of the transactions management system 200. For example, each RM *212a*, *212b*, *212c* can be provided as a computer-executable agent that is provisioned to a respective participant service *208a*, *208b*, *208c*.

While FIG. 2A depicts three participant services *208a*, *208b*, *208c* and corresponding data stores *210a*, *210b*, *210c*, it is contemplated that implementations of the present disclosure can be realized using any appropriate number of participant services and/or data stores. Also, while the initiator service 206 is absent an associated data store and a RM, it is contemplated that the initiator service 206 can be provisioned with a RM and/or associated with a data store. It should also be noted that a participant service such as *208a* may initiate its own local transaction (not shown). In such circumstances, the upstream transaction is a global transaction with respect to the downstream transaction which is a local service.

In the context of implementations of the present disclosure, a cloud-based application can be provided that is composed of the initiator service 206 and the participant services *208a*, *208b*, *208c*. For example, and with reference to the example above, the first service can be the initiator service 206, the second service can be the participant service *208a*, the third service can be the participant service *208b*, and the fourth service can be the participant service *208c*.

In some implementations, a global transaction is initiated by the initiator service 206 requesting execution of the global transaction and sending that request to the scheduled transaction manager 202. For purposes of non-limiting illustration, an example global transaction can include booking a vacation, which can include booking each of a hotel, a flight, and a rental car.

In some examples, the global transaction request can be initiated in response to a request submitted by an entity (e.g., a user, an application) to the initiator service 206. With reference to the non-limiting example, a user can interact with an application to book a vacation. In some examples, the initiator service 206 sends a global transaction request to the scheduled transaction manager 202. In some examples, in response to the request, the scheduled transaction manager 202 creates a transaction context that contains a global transaction identifier (that uniquely identifies the global transaction) and participant transaction status (e.g., reserved, confirmed, cancelled).

The scheduled transaction manager 202 calls an API of each participant service 208*a*, 208*b*, 208*c* (e.g., through the scheduled transaction coordinator 204), which join the global transaction and whose detail is recorded in the transaction context. Further, each participant service 208*a*, 208*b*, 208*c* records the global transaction identifier for its respective local transaction. In this manner, each local transaction of the participant services 208*a*, 208*b*, 208*c* are bound to the global transaction identifier. With reference to the non-limiting example, the participant service 208*a* can be a hotel reservation service, the participant service 208*b* can be an airline reservation service, the participant service 208*c* can be a car reservation service, and an example transaction context can be provided as:

Listing 1: Example Transaction Context

```
Global transaction id: 18bbbe60-0a90-46f7-bc31-d853acdc792c
Transaction details:
{
  "hotel": {
    "status": "initial",
    "reservationPeriod: null
  },
  "air": {
    "status": "initial",
    "reservationPeriod: null
  },
  "car": {
    "status": "initial",
    "reservationPeriod: null
  }
}
```

In some implementations, the scheduled transaction manager 202 initiates a global transaction timeout. For example, the global transaction timeout can include a counter that decrements over time. In some examples, if the global transaction timeout expires before the global transaction is complete, the global transaction is canceled, as discussed in further detail herein.

In some implementations, the scheduled transaction coordinator 204 transmits a local transaction request to each of the participant services 208*a*, 208*b*, 208*c*. In some examples, each local transaction request includes a local transaction request identifier (e.g., assigned by the scheduled transaction coordinator 204). Each of the participant services 208*a*, 208*b*, 208*c* processes its respective local transaction as requested, however the time it takes for all participant services 208*a*, 208*b*, 208*c* to complete their local transactions may become an issue as will be described later. In some examples, the RMs 212*a*. 212*b*, 212*c* at least partially coordinate execution of the local transactions within the respective participant services 208*a*, 208*b*, 208*c*.

In some implementations, each local transaction includes a set of states and is in one state at any given time. Example states include, without limitation, an initial state, a reserved state, a ready to commit state, and a final state. In the initial state, each participant service 208*a*, 208*b*, 208*c* receives a resource reservation request for a respective local transaction and, in response, attempts to reserve resources needed to execute the local transaction. For example, each RM 212*a*, 212*b*, 212*c* of the respective participant service 208*a*, 208*b*, 208*c* continuously attempts to reserve resources until either the resources are reserved, or the global transaction timeout expires, as discussed in further detail herein. If sufficient resources are available, the participant service temporarily blocks out time for committing the local transaction. In some examples, the amount of time that the resources are reserved depends on the specific situation for the respective participant service 208*a*, 208*b*, 208*c* (e.g., depending on number and type of requests being handled). As such, different participant services can have different reservations periods. If a participant service 208*a*, 208*b*, 208*c* reserves a resource, its state transitions from the initial state to the reserved state. In some examples, each reservation includes a reservation period, defining a period of time that the resources are reserved for the respective participant service 208*a*, 208*b*, 208*c* to commit the requested local transaction. The participant services 208*a*, 208*b*, 208*c* transmit their respective reservation periods back to scheduled transaction coordinator 204. The scheduled transaction coordinator 204 groups the received responses from each participant service 208*a*, 208*b*, 208*c* together with their global transaction identifiers (e.g., see Listing 1 above) to determine if all resources are available to commit all of the local transactions before the global transaction request times out.

In some implementations, an intersected reservation period ($t_{int}$) is determined for the participant service 208*a*, 208*b*, 208*c*, as a whole. The intersected reservation period can be described as a period of time, during which all of the participant services 208*a*, 208*b*, 208*c* have resources reserved for a particular global transaction. That is, an overlap of the reservation periods of all of the participant services 208*a*, 208*b*, 208*c* with respect to one global transaction. If all of the participant services 208*a*, 208*b*, 208*c* have resources reserved, the intersected reservation period is not null (e.g., a value of the intersected reservation period is set equal to 1) and, if not all of the participant services 208*a*, 208*b*, 208*c* have resources reserved, the intersected reservation period is null (e.g., a value of the intersected reservation period is set equal to 0).

Figure 2B:
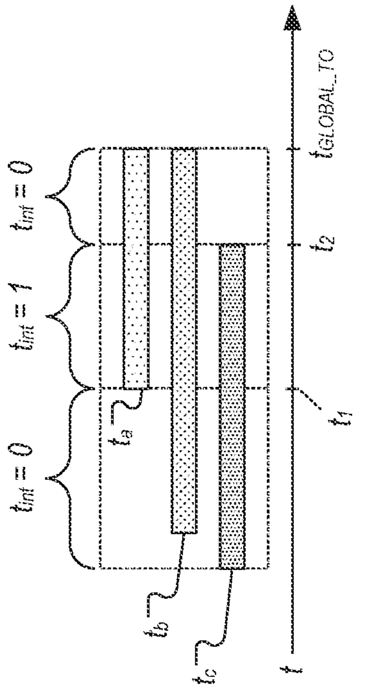
FIG. 2B depicts an example timeline.

These scenarios are depicted in FIG. 2B, where $t_a$ indicates a period of time that resources have been reserved for the participant service 208*a*, $t_b$ indicates a period of time that resources have been reserved for the participant service 208*b*, and $t_c$ indicates a period of time that resources have been reserved for the participant service 208*c*. In the example of FIG. 2B, the intersected reservation period runs from $t_1$ to $t_2$.

More particularly, at the beginning of $t_c$, the local transaction of the participant service 208*c* is done and a resource for the local transaction is reserved (e.g., inventory in a database is reserved), but not yet committed. The participant service 208*c* reports to the scheduled transaction coordinator 204 that the resource is reserved and can be committed. With reference to the non-limiting example, if 6 cars are shown as available in a car database, the participant service 208*c* can reserve 1 car (as a resource) in the car database. The resource is reserved for at least the duration of $t_c$, but is not yet committed (e.g., the car inventory recorded in the car database is reduced by 1, but that change is not yet committed in the car database).

At this point, the scheduled transaction coordinator 204 is aware that the participant service 208*c* is ready to commit its local transaction, but is not yet aware of the status of the local transactions of the participant services 208*a*, 208*b*. As such, and with reference to the non-limiting example, the transaction context can be provided as:

Listing 2: Example Transaction Context

```
Global transaction id: 18bbbe60-0a90-46f7-bc31-d853acdc792c
Transaction details:
{
  "hotel": {
    "status": "initial",
    "reservationPeriod: null
  },
  "air": {
    "status": "initial",
    "reservationPeriod: null
  },
  "car": {
    "status"; "reserved",
    "reservationPeriod: "xxxx-xx-xx"
  }
}
```

At the beginning of to, the local transaction of the participant service 208*b* is done and a resource for the local transaction is reserved (e.g., inventory in a database is reserved), but not yet committed. The participant service 208*b* reports to the scheduled transaction coordinator 204 that the resource is reserved and can be committed. With reference to the non-limiting example, if 100 airline tickets are shown as available in an airline database, the participant service 208*b* can reserve 1 airline ticket (as a resource) in the airline database. The resource is reserved for at least the duration of to, but is not yet committed (e.g., the airline ticket inventory recorded in the airline database is reduced by 1, but that change is not yet committed in the airline database).

At this point, the scheduled transaction coordinator 204 is aware that the participant services 208*b*, 208*c* are ready to commit their local transactions (assuming that the reservation period for the resource of participant service 208*c* has not yet expired), but is not yet aware of the status of the local transaction of the participant service 208*a*. As such, and with reference to the non-limiting example, the transaction context can be provided as:

Listing 3: Example Transaction Context

```
Global transaction id: 18bbbe60-0a90-46f7-bc31-d853acdc792c
Transaction details:
{
  "hotel": {
    "status": "initial",
    "reservationPeriod: null
  },
  "air": {
    "status": "reserved",
    "reservationPeriod: "yyyy-yy-yy"
```

-continued

Listing 3: Example Transaction Context

```
  },
  "car": {
    "status": "reserved",
    "reservationPeriod: "xxxx-xx-xx"
  }
}
```

At the beginning of $t_a$, the local transaction of the participant service 208*a* is done and a resource for the local transaction is reserved (e.g., inventory in a database is reserved), but not yet committed. The participant service 208*a* reports to the scheduled transaction coordinator 204 that the resource is reserved and can be committed. With reference to the non-limiting example, if 10 hotel rooms are shown as available in a hotel database, the participant service 208*a* can reserve 1 hotel room (as a resource) in the hotel database. The resource is reserved for at least the duration of $t_a$, but is not yet committed (e.g., the hotel room inventory recorded in the hotel database is reduced by 1, but that change is not yet committed in the hotel database).

At this point, the scheduled transaction coordinator 204 is aware that the participant services 208*a*, 208*b*, 208*c* are ready to commit their local transactions (assuming that the reservation periods for the resources of participant services 208*b*, 208*c* have not yet expired), and, as such, there is an intersected reservation time period. As such, and with reference to the non-limiting example, the transaction context can be provided as:

Listing 4: Example Transaction Context

```
Global transaction id: 18bbbe60-0a90-46f7-bc31-d853acdc792c
Transaction details:
{
  "hotel": {
    "status": "reserved",
    "reservationPeriod: "zzzz-zz-zz"
  },
  "air": {
    "status"; "reserved",
    "reservationPeriod: "yyyy-yy-yy"
  },
  "car": {
    "status"; "reserved",
    "reservationPeriod: "xxxx-xx-xx"
  }
}
```

In some implementations, if an intersected reservation period is achieved (e.g., $t_1$ to $t_2$, where $t_{int}$=1), the schedule transaction coordinator 204 transmits the agreement of the participant services to the participant services 208*a*, 208*b*, 208*c*. This indicates to the participant services 208*a*, 208*b*, 208*c* that they are in agreement to respective reserved resources for the global transaction and can commit the changes to the resources. The scheduled transaction coordinator 204 also transmits the agreement to scheduled transaction manager 202. In response, the global transaction can itself be confirmed and the scheduled transaction coordinator 204 can transmit confirmation to each of the participant services 208*a*. 208*b*, 208*c*. In response, all of the local transactions can be committed (e.g., changes to inventory in each of the databases are committed). In the example of FIG. 2B, all of the resources for the global transaction are received and the global transaction is to be confirmed in the time period from $t_1$ to $t_2$ (where $t_{int}=1$) and the reserved resources committed.

In some examples, and as noted above, if the global transaction cannot be confirmed before a global transaction timeout expires, the reservations are canceled and changes to the resources that had been reserved are not committed. For example, and with continued reference to FIG. 2B, it can occur that the global transaction is not confirmed within the time period from $t_1$ to $t_2$. At the end of the time period $t_c$, the resources of the participant service 208*c* are no longer reserved. Consequently, the scheduled transaction coordinator 204 can again attempt to reserve resources of the participant service 208*c* (e.g., by resending a local transaction request). However, if this cannot be achieved and the global transaction confirmed prior to expiration of a global transaction timeout, depicted as $t_{GLOBAL\_TO}$ in FIG. 2B, the global transaction times out and any reservations of any reserved resources are canceled.

Figure 3:
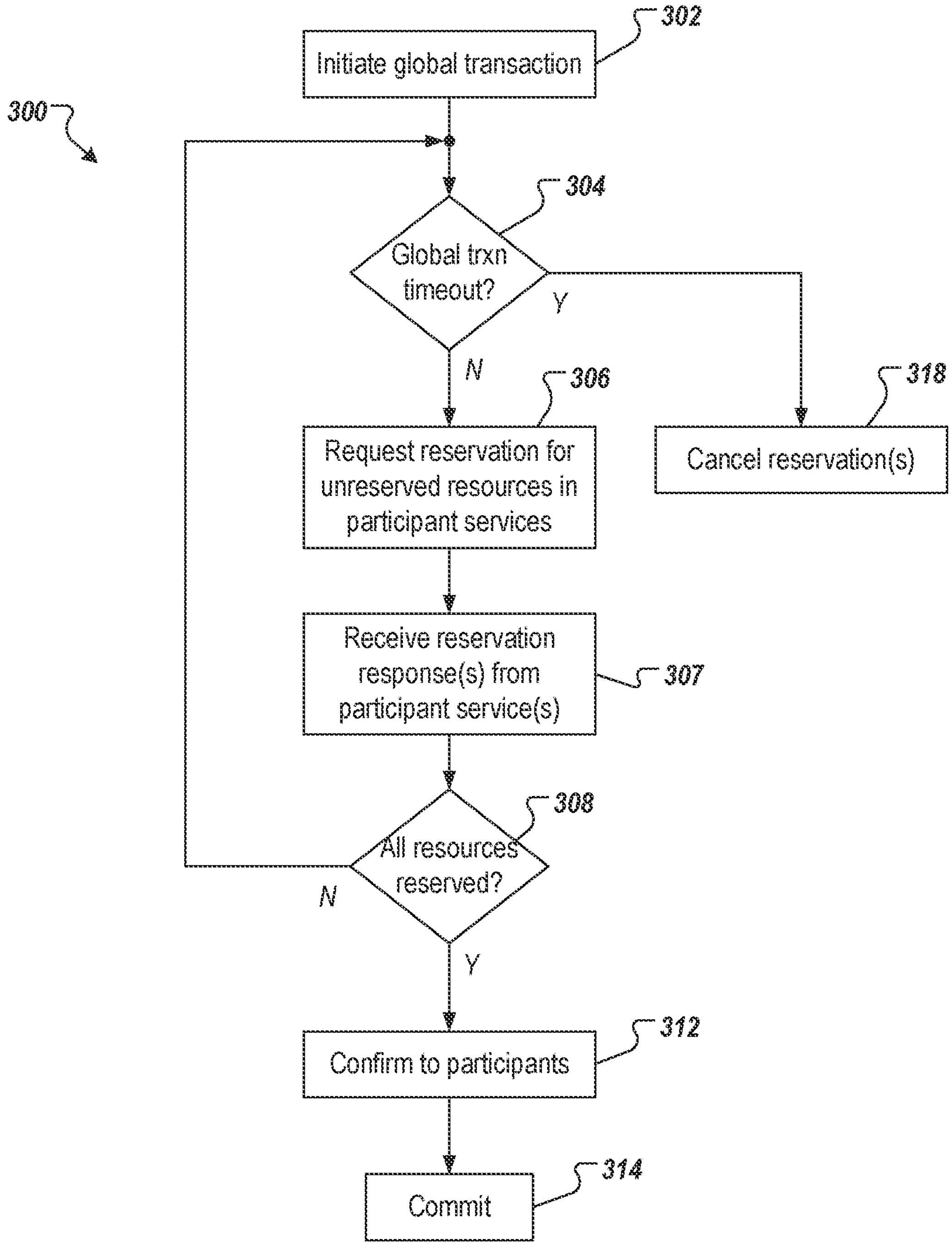
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices.

A global transaction is initiated (302). For example, and as described in detail herein with reference to FIG. 2, a global transaction is initiated by the initiator service 206 to the scheduled transaction manager 202. In some examples, the global transaction request can be initiated in response to a request submitted by an entity (e.g., a user, an application) to the initiator service 206. It is determined whether a global transaction timeout has expired (304). For example, and as described in detail herein, the scheduled transaction manager 202 initiates a global transaction timeout and such a global transaction timeout can include a counter that decrements over time.

If the global transaction timeout has not expired, reservation for any unreserved resources in participant services are requested (306). For example, and as described in detail herein, the scheduled transaction coordinator 204 transmits a local transaction request to each of the participant services 208*a*, 208*b*, 208*c* and, in response, each of the participant service 208*a*, 208*b*, 208*c* continuously attempts to reserve resources. Reservation responses are received from participant services (307). For example, if a participant service is able to reserve resources for its respective local transaction, the participant responds indicating that resources are reserved. It is determined whether all resources are reserved (308). For example, and as described in detail herein, the scheduled transaction coordinator 204 determines whether each of the participant services 208*a*, 208*b*, 208*c* has reserved resources for a respective local transaction. For example, it is determined whether $t_{int}=1$. That is, it is determined whether there are any unreserved resources and/or whether one or more reservation periods have expired and respective resources need be reserved again. For example, if a participant service has a reservation, that reservation stays until either all reservations overlap ($t_{int}=1$) and all local transaction can be committed, or the reservation times out. That is, the participant service keeps its reservation for the respective reservation timeout period. If any resources are unreserved, the example process 300 loops back.

If all resources are reserved, it is determined that there is agreement across the participant services 208*a*, 208*b*, 208*c*, and the participant services are confirmed (312) and committed (314). For example, confirmation to the participant services functions as a trigger that each can commit its respective local transaction. The local transactions are committed by the respective participant services 208*a*, 208*b*, 208*c* (e.g., changes resulting from execution of local transactions are committed to a database) to ultimately complete the global transaction.

If the global transaction timeout has expired, reservations are canceled (318). For example, if one or more participant services 208*a*, 208*b*, 208*c*, but not all participant services 208*a*, 208*b*, 208*c* have resources reserved, and the global transaction times out, any resource reservations are canceled to enable the respective participant service(s) to use those resources for other local transactions.

Figure 4:
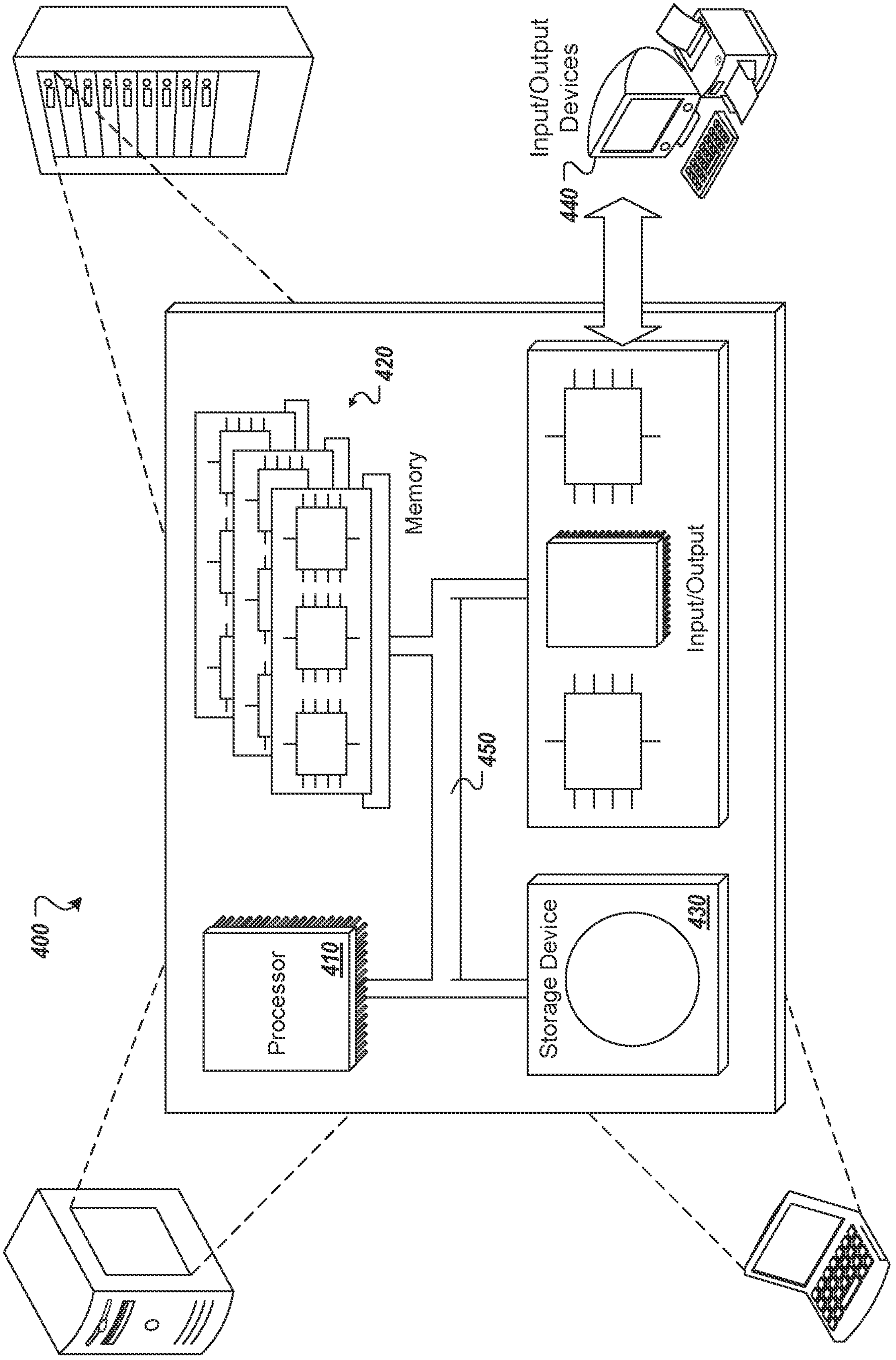
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random-access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for managing execution of transactions in cloud-based systems, the method being executed by one or more processors and comprising:

receiving, by a scheduled transaction manager, a first request from an initiator service for a first global transaction for an application executed within a cloud-based system, the application comprising a set of services where execution of the first global transaction requires a set of participant services from the set of services;

in response to receiving the first request for the first global transaction, transmitting, by a scheduled transaction coordinator, a first set of requests for a first set of local transactions to the set of participant services;

receiving, by the scheduled transaction coordinator, indications of reserved resources from participant services, each participant service having a respective local reservation period;

determining, by the scheduled transaction coordinator, that an intersected reservation period representing a temporal overlap of all respective local reservation periods is achieved; and in response to achieving the intersected reservation period:

transmitting, to each participant service in the set of participant services, an agreement indicating that the set of participant services are in agreement to reserve resources for the first global transaction to inhibit cancelation of resource reservations for each of the participant services in the set of participant services for at least the duration of the intersected reservation period, and receiving one or more results of local transactions in the set of local transactions.

2. The method of claim 1, further comprising repeatedly reserving resources for at least one participant service prior to determining that received indication of reserved resources have been received from all participant services in the set of participant services.

3. The method of claim 1, wherein in response to determining that received indication of reserved resources have been received from all participant services in the set of participant services, transitioning a transaction state of each local transaction to a confirmed state indicating that the respective local transaction is confirmed.

4. The method of claim 1, wherein in response to determining that a local transaction has been executed, transitioning a transaction state of the local transaction to committed indicating commitment of a result of the local transaction to resources in a respective participant service.

5. The method of claim 1, wherein determining that received indication of reserved resources have been received from all participant services in the set of participant services occurs prior to expiration of a global transaction timeout.

6. The method of claim 1, further comprising:

receiving, by the scheduled transaction manager, a second request for a second global transaction for the application;

in response to receiving the request for the second global transaction, transmitting, by the scheduled transaction coordinator, a second set of requests for a second set of local transactions to the set of participant services; and determining that an intersected reservation period is not achieved before a global transaction timeout has expired, and in response, cancelling resource reservations of one or more participant services.

7. The method of claim 1, wherein the set of participant services are services in the set of services and the initiator service is a service in the set of services.

8. A non-transitory computer-readable storage medium coupled to one or more processors and having instructions stored thereon which, when executed by the one or more processors, cause the one or more processors to perform operations for managing execution of transactions in cloud-based systems, the operations comprising:

receiving, by a scheduled transaction manager, a first request for a first global transaction for an application executed within a cloud-based system, the application comprising a set of services where execution of the first global transaction requires a set of participant services from the set of services;

in response to receiving the first request for the first global transaction, transmitting, by a scheduled transaction coordinator, a first set of requests for a first set of local transactions to the set of participant services;

receiving, by the scheduled transaction coordinator, indications of reserved resources from participant services, each participant service having a respective local reservation period;

determining, by the scheduled transaction coordinator, that an intersected reservation period representing a temporal overlap of all respective local reservation periods is achieved; and in response to achieving the intersected reservation period:

transmitting, to each participant service in the set of participant services, an agreement indicating that the set of participant services are in agreement to reserve resources for the first global transaction to inhibit cancelation of resource reservations for each of the participant services in the set of participant services for at least the duration of the intersected reservation period, and receiving one or more results of local transactions in the set of local transactions.

9. The non-transitory computer-readable storage medium of claim 8, wherein operations further comprise repeatedly reserving resources for at least one participant service prior to determining that received indication of reserved resources have been received from all participant services in the set of participant services.

10. The non-transitory computer-readable storage medium of claim 8, wherein in response to determining that received indication of reserved resources have been received from all participant services in the set of participant services, transitioning a transaction state of each local transaction to a confirmed state indicating that the respective local transaction is confirmed.

11. The non-transitory computer-readable storage medium of claim 8, wherein in response to determining that a local transaction has been executed, transitioning a transaction state of the local transaction to committed indicating commitment of a result of the local transaction to resources in a respective participant service.

12. The non-transitory computer-readable storage medium of claim 8, wherein determining that received indication of reserved resources have been received from all participant services in the set of participant services occurs prior to expiration of a global transaction timeout.

13. The non-transitory computer-readable storage medium of claim 8, wherein operations further comprise:

receiving, by the scheduled transaction manager, a second request for a second global transaction for the application;

in response to receiving the request for the second global transaction, transmitting, by the scheduled transaction coordinator, a second set of requests for a second set of local transactions to the set of participant services; and determining that an intersected reservation period is not achieved before a global transaction timeout has expired, and in response, cancelling resource reservations of one or more participant services.

14. The non-transitory computer-readable storage medium of claim 8, wherein the set of participant services are services in the set of services and the initiator service is a service in the set of services.

15. A system, comprising:

a computing device; and a computer-readable storage device coupled to the computing device and having instructions stored thereon which, when executed by the computing device, cause the computing device to perform operations for managing execution of transactions in cloud-based systems, the operations comprising:

receiving, by a scheduled transaction manager, a first request for a first global transaction for an application executed within a cloud-based system, the application comprising a set of services where execution of the first global transaction requires a set of participant services from the set of services;

in response to receiving the first request for the first global transaction, transmitting, by a scheduled transaction coordinator, a first set of requests for a first set of local transactions to the set of participant services;

receiving, by the scheduled transaction coordinator, indications of reserved resources from participant services, each participant service having a respective local reservation period;

determining, by the scheduled transaction coordinator, that an intersected reservation period representing a temporal overlap of all respective local reservation periods is achieved; and in response to achieving the intersected reservation period:

transmitting, to each participant service in the set of participant services, an agreement indicating that the set of participant services are in agreement to reserve resources for the first global transaction to inhibit cancelation of resource reservations for each of the participant services in the set of participant services for at least the duration of the intersected reservation period, and receiving one or more results of local transactions in the set of local transactions.

16. The system of claim 15, wherein operations further comprise repeatedly reserving resources for at least one participant service prior to determining that received indication of reserved resources have been received from all participant services in the set of participant services.

17. The system of claim 15, wherein in response to determining that received indication of reserved resources have been received from all participant services in the set of participant services, transitioning a transaction state of each local transaction to a confirmed state indicating that the respective local transaction is confirmed.

18. The system of claim 15, wherein in response to determining that a local transaction has been executed, transitioning a transaction state of the local transaction to committed indicating commitment of a result of the local transaction to resources in a respective participant service.

19. The system of claim 15, wherein determining that received indication of reserved resources have been received from all participant services in the set of participant services occurs prior to expiration of a global transaction timeout.

20. The system of claim 15, wherein operations further comprise:

receiving, by the scheduled transaction manager, a second request for a second global transaction for the application;

in response to receiving the request for the second global transaction, transmitting, by the scheduled transaction coordinator, a second set of requests for a second set of local transactions to the set of participant services; and determining that an intersected reservation period is not achieved before a global transaction timeout has expired, and in response, cancelling resource reservations of one or more participant services.

* * * * *